(12) United States Patent
Kim et al.

(10) Patent No.: US 9,894,497 B2
(45) Date of Patent: Feb. 13, 2018

(54) METHOD AND APPARATUS FOR PROCESSING MEMO WHILE PERFORMING AUDIO COMMUNICATION IN MOBILE TERMINAL

(71) Applicant: Samsung Electronics Co. Ltd., Suwon-si, Gyeonggi-do (KR)

(72) Inventors: Dongjeon Kim, Anyang-si (KR); Zunho Lee, Seongnam-si (KR); Sunghyuk Shin, Seongnam-si (KR); Hyunjung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 13/910,566

(22) Filed: Jun. 5, 2013

(65) Prior Publication Data

US 2013/0344847 A1    Dec. 26, 2013

(30) Foreign Application Priority Data

Jun. 22, 2012    (KR) .......................... 10-2012-0067204

(51) Int. Cl.
*H04W 4/12* (2009.01)
*G06F 17/21* (2006.01)
*G06F 3/01* (2006.01)

(52) U.S. Cl.
CPC ............... *H04W 4/12* (2013.01); *G06F 3/017* (2013.01); *G06F 17/21* (2013.01)

(58) Field of Classification Search
CPC ...... G06F 3/017; G06F 17/21; G06F 3/03545; H04M 1/576; H04M 1/72552; H04M 3/42382; H04M 3/5322; H04W 4/12
USPC .......................... 715/753, 758; 455/566, 466
See application file for complete search history.

(56) References Cited

U.S. PATENT DOCUMENTS

| | | | | |
|---|---|---|---|---|
| 6,246,862 | B1* | 6/2001 | Grivas | H04M 1/0202 455/566 |
| 6,442,251 | B1* | 8/2002 | Maes et al. | 379/93.23 |
| 9,063,650 | B2* | 6/2015 | Cohen | G06F 3/04883 |
| 2002/0051181 | A1* | 5/2002 | Nishimura | H04L 51/066 358/1.15 |
| 2002/0173345 | A1* | 11/2002 | Swerup et al. | 455/566 |
| 2004/0125933 | A1* | 7/2004 | Jun | H04M 3/56 379/202.01 |
| 2005/0210417 | A1* | 9/2005 | Marvit et al. | 715/863 |
| 2006/0099997 | A1* | 5/2006 | Ara | H04L 12/5835 455/566 |
| 2006/0200568 | A1* | 9/2006 | Kim | H04L 51/38 709/227 |

(Continued)

FOREIGN PATENT DOCUMENTS

JP    2006-279704 A    10/2006
KR    10-2006-0034885 A    4/2006

*Primary Examiner* — Daniel Lai
(74) *Attorney, Agent, or Firm* — Jefferson IP Law, LLP (57) ABSTRACT

A method of processing a memo while performing communication in a terminal includes: performing the communication; activating a touch memo input mode in response to a predetermined event occurring; displaying a touch memo on a display device in a communication state and performing a communication service, in response to receiving an input of the touch memo; and transmitting the touch memo to a communicating subscriber and maintaining the communication state after a request for transmission of the touch memo is input.

17 Claims, 8 Drawing Sheets

(56) References Cited

U.S. PATENT DOCUMENTS

| | | | |
|---|---|---|---|
| 2006/0224433 A1* | 10/2006 | Baek | G06Q 10/109 455/566 |
| 2007/0087789 A1* | 4/2007 | Lee et al. | 455/566 |
| 2007/0123300 A1* | 5/2007 | Park et al. | 455/556.1 |
| 2008/0005423 A1* | 1/2008 | Jacobs et al. | 710/62 |
| 2008/0268826 A1* | 10/2008 | Nelson | 455/416 |
| 2009/0273587 A1* | 11/2009 | Tsuei et al. | 345/179 |
| 2009/0300125 A1* | 12/2009 | Wang et al. | 709/206 |
| 2010/0056220 A1* | 3/2010 | Oh et al. | 455/566 |
| 2010/0159998 A1* | 6/2010 | Luke et al. | 455/567 |
| 2012/0317483 A1* | 12/2012 | Shapiro | G06Q 10/101 715/716 |
| 2013/0072148 A1* | 3/2013 | Bhatnager | 455/405 |

* cited by examiner

METHOD AND APPARATUS FOR PROCESSING MEMO WHILE PERFORMING AUDIO COMMUNICATION IN MOBILE TERMINAL

PRIORITY

This application claims the benefit under 35 U.S.C. § 119(a) of a Korean patent application filed on Jun. 22, 2012 in the Korean Intellectual Property Office and assigned Serial No. 10-2012-0067204, the entire disclosure of which is hereby incorporated by reference.

BACKGROUND

Field

Exemplary embodiments relate to a method and apparatus for providing a communication service of a mobile terminal More particularly, exemplary embodiments relate to a method and apparatus for processing a memo by a touch input in a communication state.

Description of the Related Art

Terminals of the related art may perform an operation control and a data input of the terminal through a touch panel. In this case, the touch panel of the related art uses a capacitive type and a resistive type that senses a touch from a user's finger. In this case, when inputting data in a device using the touch panel, a keypad (keypad of Korean alphabet, English, or numerals) for inputting data is displayed, and when touching a character area on the keypad, a method is used for recognizing a touch position of a terminal and determining input data.

Further, in the related art terminals, devices have been developed to use a pen for finely performing a cursive script input or a drawing input, such as a line. For example, electro magnetic resonance (EMR) technology of Wacom company senses a pen input through a resonance between a flexible printed circuit board (FPCB) and an EMR exclusive pen by adding an EMR sensor pad under a liquid crystal display (LCD).

In the related art terminal having the above touch panel, it is necessary to record information generated while communicating in a communication service mode. In this case of the related art, user records information generated, while communicating using a writing instrument and scratch paper. However, when performing hands free communication, the user can determine a display unit of the terminal, and execute other applications in addition to a communication function. Therefore, in a state of performing hands free communication, a method of writing information generated while communicating may be embodied.

SUMMARY

Exemplary embodiments may provide a method and apparatus that can write a touch input in memo information in a communication state in a terminal having a touch panel, and can transmit the written information while communicating, or after communication is terminated.

Exemplary embodiments may further provide a method and apparatus that can activate a touch panel in a hands free communication state, can write a touch input in memo information while performing a communication service when a touch input is sensed, and can transmit a written touch memo to a communicating subscriber in a communication state.

Exemplary embodiments may further provide a method and apparatus that can activate a touch panel in a hands free communication state, can write and store a touch input in memo information while performing a communication service when a touch input is sensed, can set a transmitting method and/or a subscriber to transmit a touch memo after communication is terminated, and can transmit the stored touch memo.

In accordance with an aspect of the exemplary embodiments, a method of processing a memo while performing communication in a terminal includes: performing the communication; activating a touch memo input mode in response to a predetermined event occurring; displaying a touch memo on a display device in a communication state and performing a communication service, in response to receiving an input of the touch memo; and transmitting the touch memo to a communicating subscriber and maintaining the communication state after a request for transmission of the touch memo is input.

In accordance with another aspect of the exemplary embodiments, a method of processing a memo while performing communication in a terminal includes: performing the communication; activating a touch memo input mode in response to a predetermined event occurring; displaying a touch memo on a display device in a communication state and performing a communication service, in response to receiving an input of the touch memo; storing the touch memo in response to a request for storage of the input touch memo; and transmitting the touch memo after the communication is terminated in response to a request for transmission of the touch memo after communication termination is input.

In accordance with another aspect of the exemplary embodiments, an apparatus for processing a memo while performing communication in a terminal includes: a communication device which communicates a communication audio signal; a touch panel which senses a pen touch input; a storage unit which stores a touch memo while communicating; a controller which controls to display a touch memo input through the touch panel in a hands free communication state, transmits the touch memo to a communicating subscriber through the communication device, in response to a request for transmission of the input touch memo, and maintains the hands free communication state; and a display device which displays the touch memo by the control of the controller.

In accordance with another aspect of the exemplary embodiments, a method of generating and transmitting a touch memo in a terminal includes: entering a hands free communication state in the terminal; activating a touch memo input mode for inputting a touch memo in response to a predetermined event in the hands free communication state; displaying the input touch memo on a display device and performing hands free communication, in response to the input touch memo; and transmitting the touch memo to a communication subscriber through a communication device in a text file or an image file.

BRIEF DESCRIPTION OF THE DRAWINGS

The objects, features and advantages of the exemplary embodiments will be more apparent from the following detailed description in conjunction with the accompanying drawings, in which.

DETAILED DESCRIPTION OF EXEMPLARY EMBODIMENTS

Hereinafter, exemplary embodiments are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the exemplary embodiments.

In the following description, a term "touch memo" indicates information in which a terminal user inputs through a touch panel in a communication state, and the touch memo may be a pen touch input and/or a finger touch input. Further, the touch memo may include a cursive script character and a non-character pattern (figure, picture, or line). A term "hands free" indicates user communication that occurs without a terminal contacting an ear. Hands free may include speakerphone communication, earphone communication, and short range wired/wireless communication. A term "touch panel" is a panel for sensing an input touched through a finger and a pen. A touch panel may include decompressive, capacitive, and electro magnetic resonance (EMR) touch panels. A term "transmitting method" indicates a method of communicating with information and voice in a terminal. A transmitting method may include a multimedia message service (MMS), short message service (SMS), social networking service (SNS), e-mail service, and instant messenger service.

According to the exemplary embodiments, in a hands free communication state, a terminal can automatically or manually activate a touch panel, write information input through the touch panel in a communication state in a touch memo, and transmit the written touch memo to the communicating subscriber side in a communication state. In this case, the transmitted touch memo may be transmitted in an image or a file converted to a text, according to a transmitting method. Further, when the communication state is multilateral communication, the user may select some communication subscribers, transmit a touch memo, or may transmit a touch memo to all communication subscribers.

Further, in the exemplary embodiments, in a hands free communication state, a terminal may automatically or manually activate a touch panel. In a communication state, information input through a touch panel may be written and stored in a touch memo. After communication is terminated, a subscriber may be set in order transmit a touch memo to the preset subscriber, and the stored touch memo may be transmitted to the preset subscriber. In this case, the preset subscriber may be another subscriber of the communication, or another subscriber registered at a phonebook. When transmitting the touch memo, a transmitting method may be selected, and the touch memo may be converted and transmitted according to the selected transmitting method. In this case, the transmitting method may be an MMS, SMS, SNS, e-mail service, or instant messenger service messenger. In this case, subscriber information according to the transmitting method may have different identification information according to a transmitting method. Therefore, when identification information of a subscriber to transmit a touch memo is selected, a transmitting method may be automatically set. In this case, a transmitted touch memo may be an image or a file converted to a text according to the transmitting method. The touch memo may be transmitted, or may be transmitted in an attached file form.

Figure 1:
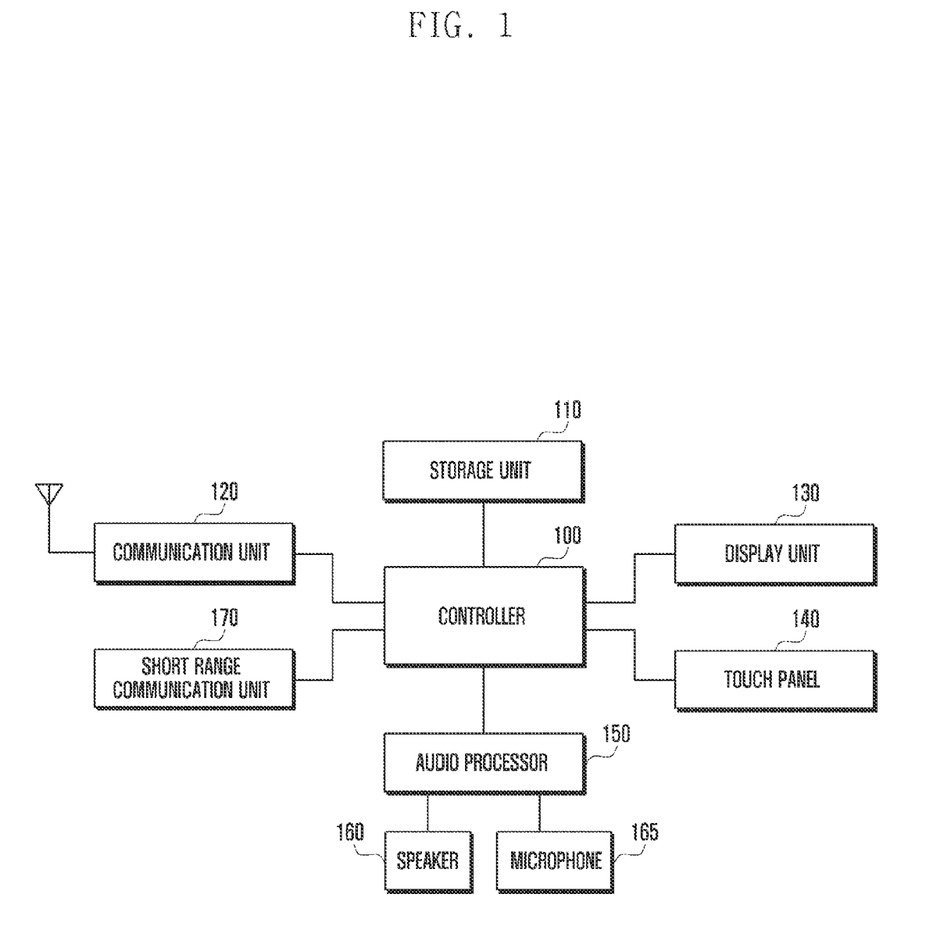
FIG. 1 is a block diagram illustrating a configuration of a terminal according to an exemplary embodiment.

FIG. 1 is a block diagram illustrating a configuration of a terminal according to an exemplary embodiment.

The terminal is a mobile terminal, and may be various digital devices such as a mobile phone including a smart phone, an MP3 terminal, a tablet PC, and a laptop computer.

Referring to FIG. 1, the terminal includes a controller 100, storage unit 110, communication unit 120, display unit 130, touch panel 140, audio processor 150, speaker 160, microphone 165, and short range communication unit 170.

The communication unit 120 performs a wireless communication function with a base station or another apparatus. The communication unit 120 may be an RF unit including a transmitter for up-converting a frequency of a signal to be transmitted and amplifying the signal, and a receiver for down-converting a frequency of a received signal and low-noise amplifying the signal. Further, the communication unit 120 includes a modulation unit and a demodulation unit. Here, the modulation unit modulates a signal to be transmitted and outputs the signal to the transmitter, and the demodulation unit demodulates a signal received through the receiver. In this case, the modulation unit and the demodulation unit may use long term evolution (LTE), wideband code division multiple access (WCDMA), global system for mobile (GSM), WIFI, and wireless broadband (WIBRO). The communication unit 120 is connected to a public wireless communication network and/or an Internet network to perform a wireless communication function between the terminal and the corresponding network. In the present exemplary embodiment, the communication unit 120 includes an LTE communication unit for communicating between a LTE base station and a WIFI communication unit.

The controller 100 may control operations of a mobile terminal. In the present exemplary embodiment, the controller 100 controls a function of converting a touch input into a generated touch memo in a communication state, and transmitting the generated touch memo to a preset subscriber in a communication state or after communication is terminated. The controller 100 may include a communication processor and an application processor for performing an application of the terminal. When the controller 100 includes the communication processor, a modem for modulating and demodulating the transmitting and receiving signals may be included in the communication processor.

The storage unit 110 may include a program memory for storing an operation program of the terminal, a program according to the present exemplary embodiment, tables for operation of the terminal, and a data memory for storing data generated while performing a program. Further, the storage unit 100 may include a hardware module or circuit for storing.

The display unit 130 displays information of an executing application by the control of the controller 100. The display unit 130 may be a liquid crystal display (LCD) or an organic light-emitting diode (OLED).

The touch panel 140 may be embodied in decompressive, capacitive, and/or EMR type, and senses an inputted user touch (hereinafter, "a finger touch") and/or an inputted pen touch, and outputs the touch input to the controller 100. In the present exemplary embodiment, the touch panel 140 may be a combined panel of a capacitive panel and an EMR panel. The capacitive panel of the touch panel 140 senses the inputted user finger touch, and the EMR panel senses a pen touch input. The display unit 130 and the touch panel 140 may be formed in an integral touch screen.

The audio processor 150 processes a communication sound and an audio signal of the terminal. The audio processor 150 processes an audio signal input from the microphone 165, inputs the audio signal to the controller 100, and processes a signal output from the controller 100 into an audio signal and outputs the audio signal to the speaker 160. The speaker 160 and the microphone 165 may be formed in an integral speakerphone, and the terminal may perform a hands free communication function through the speakerphone. The audio processor 150 may include a hardware module or a circuit for processing.

The short range communication unit 170 in the terminal may perform a short range communication function with an external apparatus. Short range communication may be embodied in wired and wireless communication functions. Wireless short range communication may use near field communication (NFC) and Bluetooth communication methods, and wired short range communication may use a universal serial bus (USB) communication method. In the present exemplary embodiment, the external apparatus may be a headphone. The terminal is connected to a headphone through the short range communication unit 170 to perform a hands free communication function.

In a terminal having the above configuration, the user can perform hands free communication using the terminal. In this case, hands free communication may be speakerphone communication using the speaker 160 and the microphone 165, earphone communication using an earphone (not shown), and communication using a headphone that performs short range communication through the short range communication unit 170. As described above, hands free audio dedicated communication may be performed through a public wireless network (LTE or WCDMA), and may be voice over Internet protocol (VoIP) communication through an Internet network.

As described above, when the hands free communication function is performed, the user may freely use both hands or one hand. In a state of performing a hands free communication function, when it is necessary to record information generated while communicating or to transmit information to another subscriber, the user writes necessary information through the touch panel 140. In this case, the information may be generated through the touch panel 140. In particular, information may be generated through the touch panel 140 in a terminal using a pen, such that a memo may be freely written. Here, the memo is referred to as a touch memo. The touch panel 140 may include a touch panel for sensing the inputted user finger touch, and a touch panel for sensing an inputted pen touch. The touch panels may be independently formed or may be independently provided. In the present exemplary embodiment, it is assumed that the touch panel 140 includes a capacitive panel for sensing a finger touch input, and an EMR panel for sensing a touch of an electronic pen.

The capacitive panel uses a method in which a machine senses a micro current flowing in a body, and may perform a multi-touch and use a finger and a special pen that may cause static electricity. The EMR method uses a method of sensing electromagnetism generated in a touch sensor and an exclusive pen, may recognize intensity of a writing pressure of the exclusive pen, and perform an action of a right click or a left click like a mouse. Further, a minute manipulation may be performed in consideration of a writing pressure, such as a writing brush picture. When a pen exists adjacent to a screen without an actual touch, a coordinate may be moved. The display unit 130 and the touch panel 140 may be integrally formed. In this case, a capacitive panel may be mounted in an upper portion of the display unit 130, and an EMR method panel may be mounted in a lower portion of the display unit 130.

In the following description, it is assumed that the touch memo is written by a pen touch input. However, the touch memo may be written by a finger touch input, or may be generated using both a pen touch input and a finger touch input.

In a terminal having the above configuration, when a pen touch input is activated in a hands free communication state, the controller 100 controls the display unit 130 to display a touch memo input window. In this case, when the controller 100 senses a button manipulation of a pen through the touch panel 140 or senses a pen touch action, the controller 100 activates a touch memo input window in the display unit 130. In this case, the pen touch action may be a preset specific gesture or a preset touch pattern (e.g., rotation touch, flick, or specific position touch). Further, the controller 100 may control the display unit 130 to display an item that can write a touch memo in a hands free communication mode, and to activate a touch input mode when a corresponding icon is touched.

As described above, when a touch input mode is activated, the controller 100 senses a touch input through the touch panel 140, and generates touch memo information while performing an audio dedicated communication service through the communication unit 120. In this case, in a pen touch input, the touch memo may be formed with a cursive script character (including numerals) and/or non-character information (e.g., figure, picture, or line). The controller 100 controls the generated touch memo to be an image file, and to display the image file in the display unit 130. In a state in which the touch memo is displayed, in order to process the touch memo, the controller 100 controls the display unit 130 to display related items. The related item may be displayed in an icon or soft button form. The related item may be used to transmit a generated touch memo while communicating. Further, the related item may be a writing completion item for storing the touch memo.

After a touch memo is written in the hands free communication state, when transmission of the touch memo is selected, the controller 100 senses the selection through touch panel 140, and transmits the written touch memo to a communicating subscriber through the communication unit 120. In this case, the transmitted touch memo may be an image file. Further, when the transmitting function is selected, the controller 100 may transmit a list for selecting a transmitting method. For example, a method of transmitting information to another subscriber phone number in a communication state may be an SMS or an MMS. In this case, the controller 100 controls the display unit 130 to display a list that selects a transmitting method, and transmits the touch memo by a method selected by the user. In this case, when the SMS transmission is selected, the controller 100 converts the written touch memo to a text, and transmits the converted text character to another subscriber by an SMS in a communication state. Further, when the MMS transmission is selected, the controller 100 transmits the written touch memo to another subscriber by an MMS in a communication state. When transmitting by the MMS, the controller 100 analyzes a type of the another subscriber device, and if the terminal and the device are the same type, the controller 100 transmits the generated touch memo (i.e., editable image file). If the terminal and the device are different types, the controller 100 converts the generated touch memo to a general image file, and transmits. The same kind of device may generate and edit a touch memo generated in the terminal with the same method (e.g., a device produced by the same manufacturer and using the same touch input).

Further, in the hands free communication state, after a touch memo is written, when a transmission is selected, the controller 100 senses the selection through the touch panel 140, and determines whether presently servicing communication is multilateral communication. In other words, when the hands free communication is a conference call, communicating persons may be three or more. In this case, a generated touch memo may be transmitted to entire subscribers while performing communication, and some subscribers while performing communicating may be selected, and a touch memo may be transmitted to the some subscribers. Therefore, when multilateral communication is performing, the controller 100 may control the display unit 130 to display presently communicating subscriber identification information, and transmit the touch memo only to subscribers selected by the user.

Further, in a hands free communication state, after a touch memo is written, when writing completion of the touch memo is selected, the controller 100 senses this through the touch panel 140 and stores the written touch memo at the storage unit 110. In this case, the stored touch memo may be an image file form. In this case, the stored touch memo may be transmitted to a communicating subscriber, or different subscribers from a communication subscriber, after hands free communication is terminated. In other words, when a transmitting function is selected after communication termination, the controller 100 may select a subscriber to transmit the touch memo. In this case, the transmitting subscribers may have various identifier information for the same user according to a transmitting method. In this case, when a request for transmission of a touch memo is input through the touch panel 140, the controller 100 displays phonebook information and a subscriber information (e.g., phone number, e-mail, SNS, or messenger identification information) input by the user, and transmits the touch memo according to the selected subscriber identification information.

Figure 2:
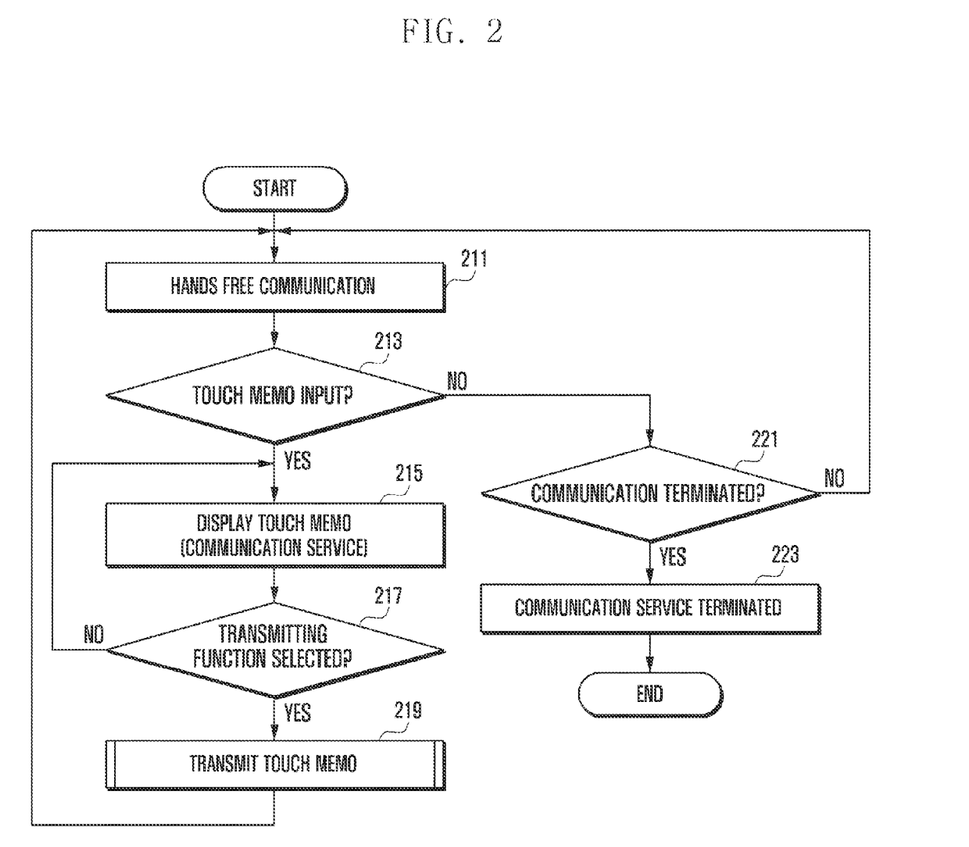
FIG. 2 is a flowchart illustrating a procedure of generating and transmitting a touch memo in a hands free communication state in the terminal of FIG. 1.
Figure 8:
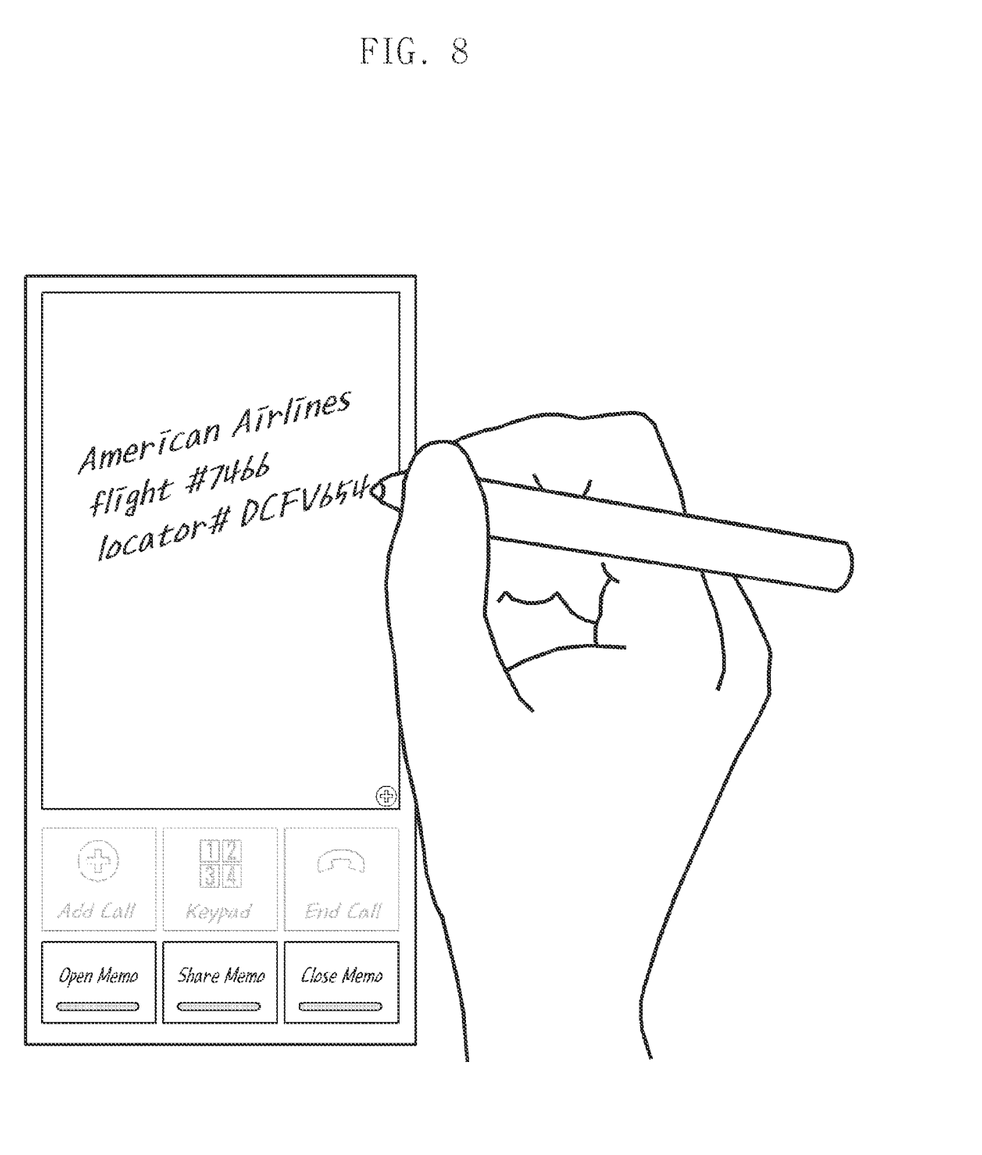
FIG. 8 is a diagram illustrating an example of writing a touch memo in a hands free communication state.

FIG. 2 is a flowchart illustrating a procedure of generating and transmitting a touch memo in a hands free communication state in the terminal of FIG. 1. FIG. 8 is a diagram illustrating an example of writing a touch memo in a hands free communication state.

Referring to FIGS. 2 and 8, the terminal is in a hand free communication state (211). The hands free communication may be a speakerphone communication mode, short range communication mode, and earphone communication mode. In the speakerphone communication mode, an audio signal received through the communication unit 120 is reproduced in the speaker 160 through the audio processor 150, and a transmitting sound signal input to the audio processor 150 through the microphone 165 is transmitted through the communication unit 120. Further, an earphone may be connected to the audio processor 150, and when the earphone is connected, the controller 100 senses a connection of the earphone through the audio processor 150. In the earphone communication mode, the controller 100 outputs a communication audio signal to the earphone through the audio processor 150. Further, in the short range communication mode, the controller 100 forms a communication link with a headphone, which is an external apparatus, through the short range communication unit 170, and transmits and receives a communication audio signal through the formed communication link.

In the hands free communication state, the controller 100 activates the touch panel 140. In this case, the entire touch panel 140 may be activated by activating the touch panel 140. In this case, because the touch panel 140 may be operated by an unintended touch of the user, the controller 100 senses a specific touch action in a hands free communication state, or displays an item (icon or soft button) for activating a touch memo at a preset position of the display unit 130, and activates the touch panel 140, when the user touches a corresponding item.

When a predetermined event occurs, the touch panel may be activated, and a touch memo input mode may be activated. The event that activates a touch memo input mode may be an event that senses a hands free communication state, an event in which a pen is separated from a terminal, an event in which a distance between the terminal and the user increases to a predetermined distance or more, and an event in which a preset gesture is sensed.

As described above, when the touch panel 140 for inputting a touch memo is activated and a touch memo input mode is activated, the controller 100 determines whether a touch memo is input (213). If a touch memo is input, the controller 100 controls the display unit 130 to display the touch memo input through the touch panel 140 (215), and the controller 100 controls the communication unit 120 to perform a preset form of hands free communication (speakerphone communication, earphone communication, or communication using the short range communication unit 170). In this case, the controller 100 controls the display unit 130 to display a transmitting item for transmitting a written touch memo and/or a writing termination item for terminating to write a touch memo. As shown in FIG. 8, the controller 100 uses a touch input sensed through the touch panel 140 to generate a touch memo, and controls the display unit 130 to display the touch memo. After the touch memo is written, when the controller 100 determines that a transmitting function is selected (217), the controller 100 transmits the written touch memo to a communicating subscriber through the communication unit 120 (219). In this case, the transmitted touch memo may be transmitted in a text file or an image file form.

Figure 3:
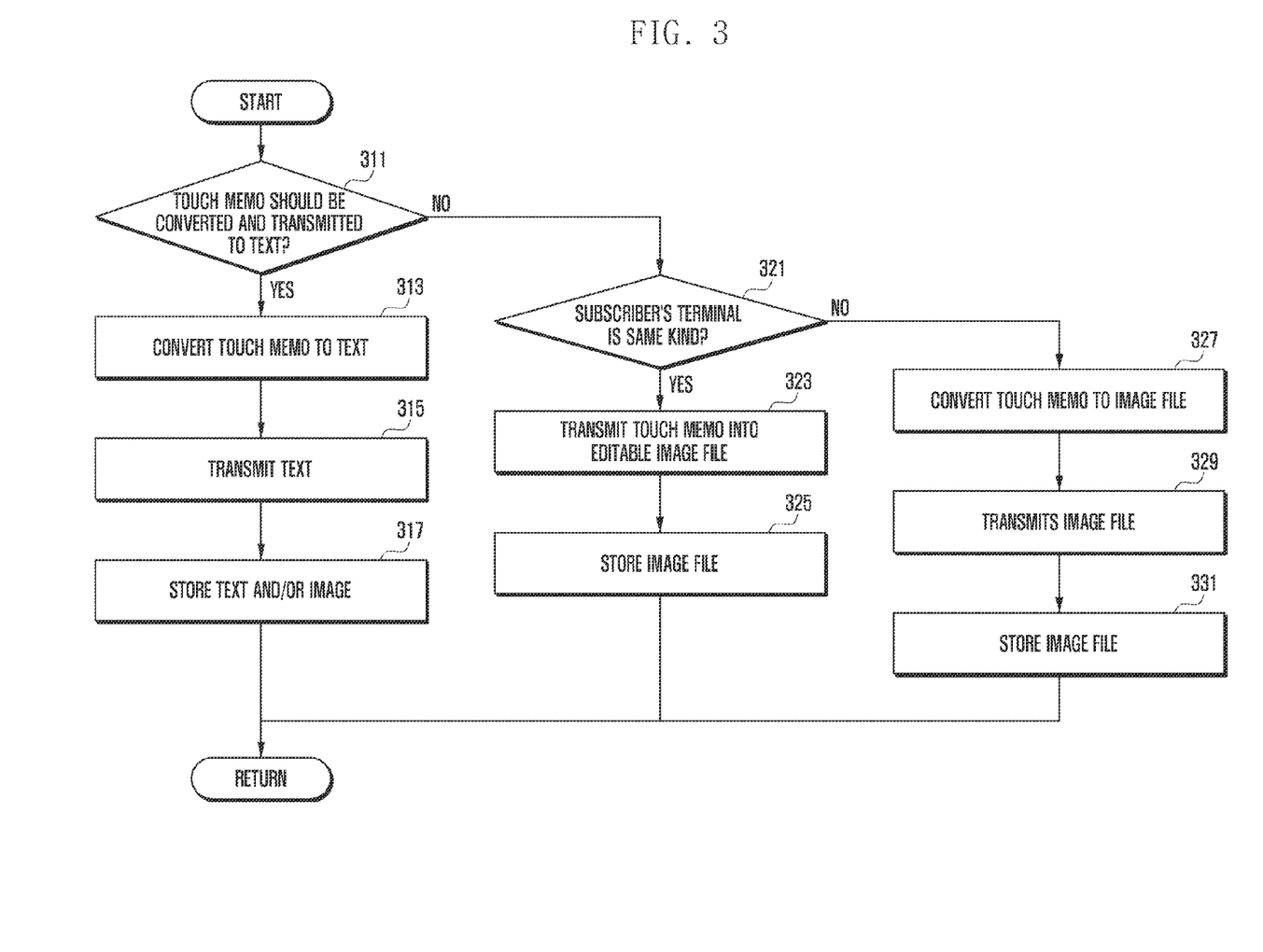
FIG. 3 is a flowchart illustrating an operation procedure of a process of transmitting a touch memo of FIG. 2.

FIG. 3 is a flowchart illustrating an operation procedure of a process of transmitting a touch memo of FIG. 2.

Referring to FIG. 3, the controller 100 determines whether the touch memo should be converted and transmitted to a text (311). When information is transmitted in a communication state, a phone number may be identification information of another subscriber which receives information, and a method of transmitting through the phone number is an SMS or an MMS. In this case, when the SMS is set to a transmitting method, information that should transmit to another subscriber should be a text form.

If the touch memo should be converted and transmitted to a text, the controller 100 drives a character recognition engine, converts image information generated by a touch input to a text (313), and transmits the converted text through the communication unit 120 (315).

The controller 100 stores an image file and/or information converted to a text of a touch memo written by the touch input at the storage unit 110 (317).

If it is unnecessary to convert and transmit the touch memo to a text at step 311, i.e., if the transmitting method is not a text transmitting method, the controller 100 determines whether another subscriber terminal is the same kind as that of the terminal (321). A terminal for processing a pen touch input generates an image file that can correct or edit a touch input written by the pen touch. Therefore, when a presently communicating subscriber terminal is a terminal that is produced by the same manufacturer and that can process a pen touch input function, it is preferable to transmit an image file of the touch memo generated at step 215 of FIG. 2.

If another subscriber terminal is the same kind as that of the terminal, the controller 100 transmits the touch memo into an editable image file (i.e., an image file of a written touch memo) (323), and stores the transmitted image file of the touch memo at the storage unit 110 (325).

If another subscriber terminal is not the same kind as that of the terminal at step 321, the controller 100 converts the written touch memo to a general image file (e.g., JPEG or TIFF) (327), transmits the converted general image file through the communication unit 120 (329), and stores the image file of the touch memo (331). In this case, the stored image file of the touch memo may be a converted general image file and/or an image file of the touch memo generated at step 215.

Further, the hands free communication may be one-to-one audio dedicated communication and multilateral audio dedicated communication. For example, a conference call may be executed in multilateral audio dedicated communication. In this case, when multilateral audio dedicated communication is performed, the touch memo may be transmitted to only some subscribers of communicating subscribers.

Figure 4:
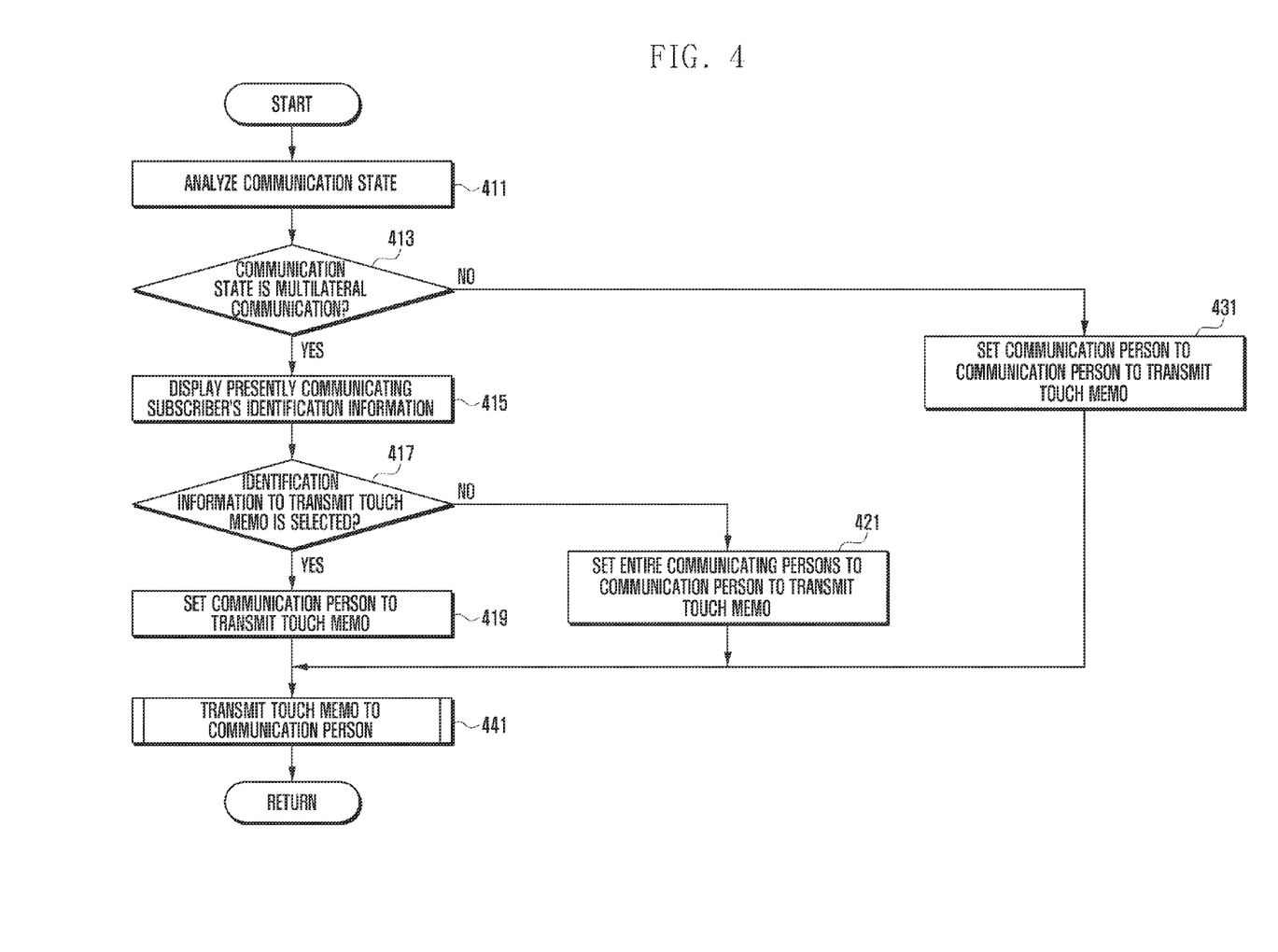
FIG. 4 is a flowchart illustrating another procedure of transmitting a touch memo in a communication state of FIG. 2.

FIG. 4 is a flowchart illustrating another procedure of transmitting a touch memo in a communication state of FIG. 2.

Referring to FIG. 4, if a request for transmission of a touch memo is input at step 217 of FIG. 2, the controller 100 analyzes a present communication state (411). The communication state may be one-to-one audio dedicated communication or multilateral audio dedicated communication.

The controller 100 determines whether the communication state is multilateral communication (413). If the communication state is multilateral communication, the controller 100 controls the display unit 130 to display a presently communicating subscriber identification information (e.g., a phone number and/or subscriber name) (415).

The controller 100 determines whether identification information to transmit a touch memo is selected in the display unit 130 (417). If identification information to transmit a touch memo is selected, the controller 100 sets a subscriber corresponding to the identification information to a communication person to transmit the touch memo (419).

If identification information to transmit a touch memo is not selected at step 417, the controller 100 sets entire communicating persons to a communication person to transmit the touch memo (421).

If the communication state is not multilateral communication, i.e., if a present subscriber of hands free communication is one person at step 413, the controller 100 sets the communication person to a communication person to transmit the touch memo (431).

When a communication person to transmit the touch memo is set, the controller 100 transmits the written touch memo to the preset communication person (441). In this case, as shown in FIG. 3, a touch memo transmitting procedure of step 441 may be performed.

Further, although not shown in FIG. 2, in a state of writing a touch memo according to a touch input at step 215, when the user selects a touch input completion item, the controller 100 stores the written touch memo at the storage unit 110 and services a hands free communication function (211). In other words, although not shown in FIG. 2, while writing a touch memo, if a request for termination or cancellation of writing the touch memo is input, a termination or cancellation action of writing of the touch memo is performed, the process returns to step 211, and the controller 100 continues to perform a hands free communication service. Therefore, after a touch memo is written and transmitted (or terminated, cancelled), if communication termination is not requested, the controller 100 performs a hands free communication service (211). The controller 100 determines whether a request for terminating communication is input by the user (221) at step 213, and if a request for terminating communication is input by the user, the controller 100 terminates a hand free communication service (223).

As described above, in a hands free communication state, a memo may be written using a pen and the written memo may be transmitted to a presently communicating subscriber. In this case, the transmitted touch memo may be converted and transmitted to a text file or transmitted into an image file according to a transmitting method. In this case, the touch memo may be written using a touch pen (e.g., electronic pen), and the touch memo may be information in which another subscriber requests while communicating, and the information (e.g., scheduled appointment) may be shared with another subscriber. Therefore, when it is necessary to take a memo in a hands free communication state, a memo may be written using a touch pen without a separate writing instrument and scratch paper, and the written memo may be easily stored.

As described above, a touch memo written in a communication state may be transmitted to a communication subscriber or another subscriber after communication is terminated. In this case, a method of transmitting a touch memo may be variously changed to a desired form. Further, after communication is terminated, when the touch memo is transmitted, the touch memo written while communicating may be corrected and edited, and transmitted into re-written information after communication.

Figure 5:
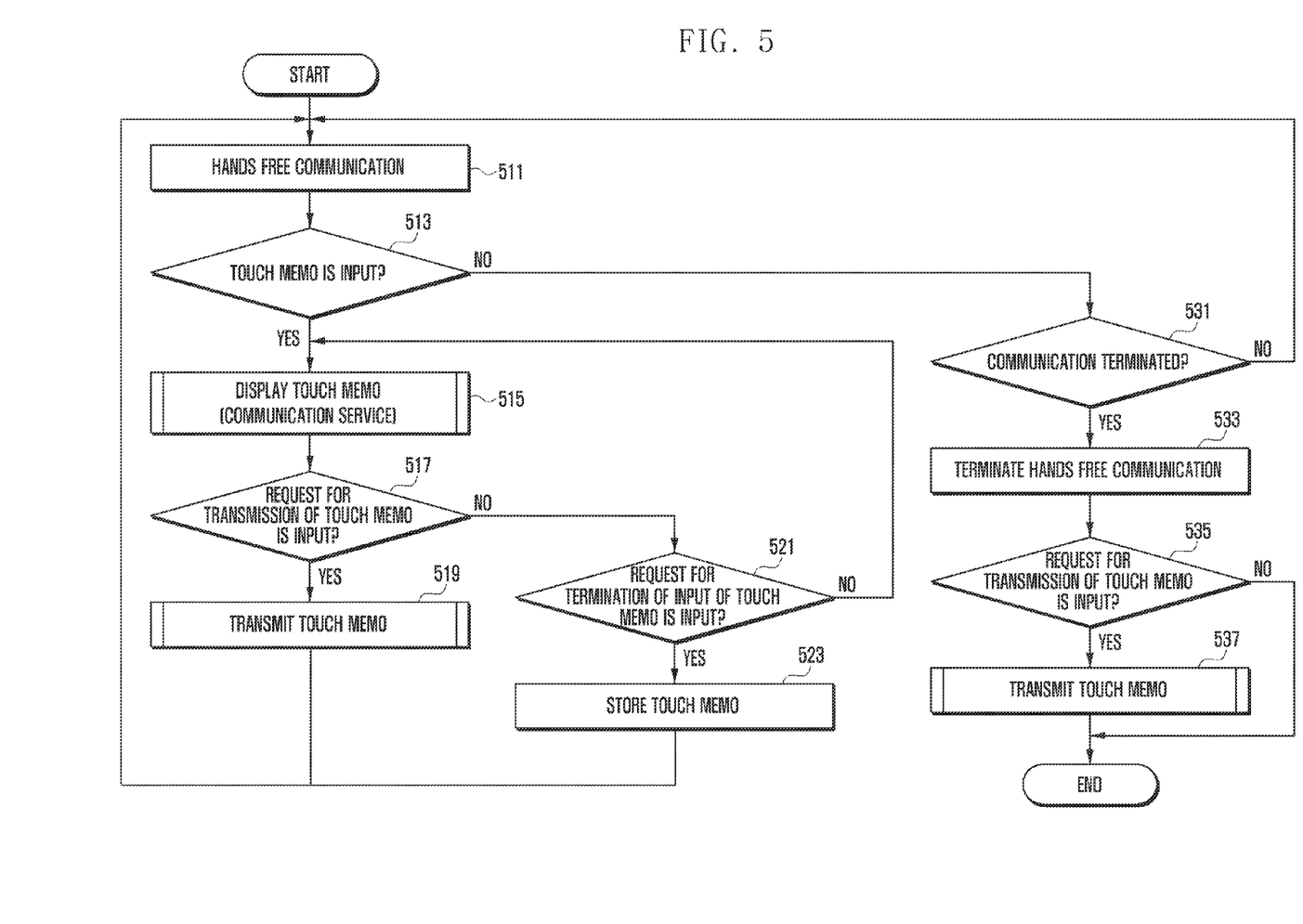
FIG. 5 is a flowchart illustrating a procedure of generating a memo according to a touch input in a hands free communication state or transmitting a generated touch memo while communicating or after communication is terminated in the terminal of FIG. 1.

FIG. 5 is a flowchart illustrating a procedure of generating a memo in the terminal of FIG. 1, according to a touch input in a hands free communication state or transmitting a generated touch memo while communicating or after communication is terminated.

Referring to FIG. 5, the controller 100 performs a hands free communication service (511). In this case, as described above, hands free communication may be in a speakerphone communication mode, earphone communication mode, or communication mode using the short range communication unit 170.

The controller 100 determines whether a touch memo is input in the hands free communication mode (513). If a touch memo is input in the hands free communication mode, the controller 100 uses information input through the touch panel 140 to generate a touch memo, and controls the display unit 130 to display the touch memo (515), as shown in FIG. 8.

The controller 100 determines whether a request for transmission of the touch memo is input (517), and if a request for transmission of the touch memo is input, the controller 100 transmits the written touch memo to a communication subscriber in a hands free communication performing state (519). Operation of steps 511-519 of FIG. 5 may be performed similar to steps 211-219 of FIG. 2.

Figure 6:
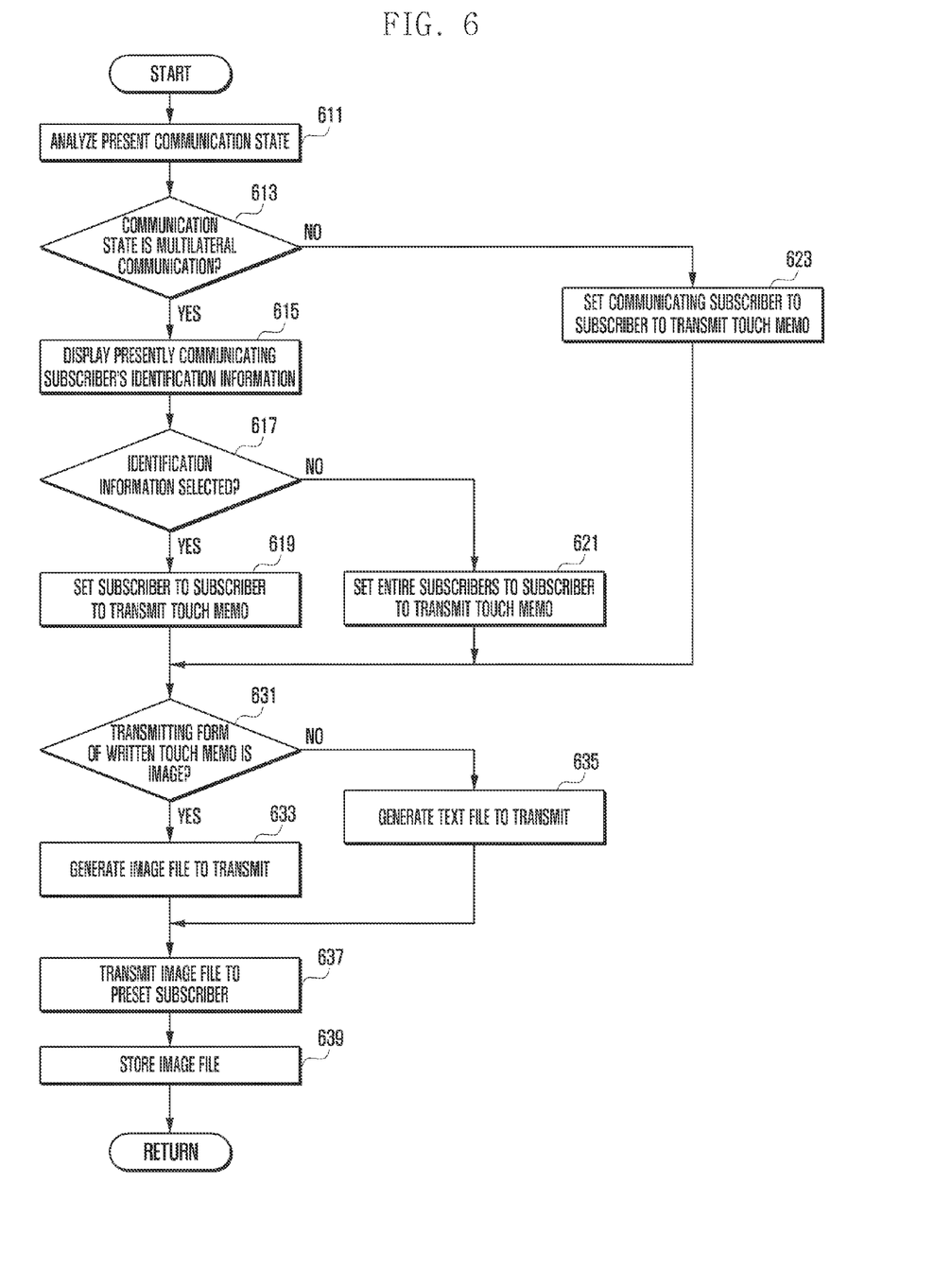
FIG. 6 is a flowchart illustrating a procedure of transmitting a touch memo in a communication state of FIG. 5.

A method of transmitting a touch memo of step 519 may be performed through a procedure of FIG. 6.

FIG. 6 is a flowchart illustrating a procedure of transmitting a touch memo in a communication state of FIG. 5.

Referring to FIG. 6, when a request for transmitting a touch memo is input in a communication state, the controller 100 analyzes a present communication state (611). The communication state may be one-to-one audio dedicated communication or multilateral audio dedicated communication.

The controller 100 determines whether the communication state is multilateral communication (613), and if the communication state is multilateral communication, the controller 100 controls the display unit 130 to display presently communicating subscriber identification information (615).

The controller 100 determines whether identification information is selected (617), and if identification information is selected, the controller 100 sets a subscriber corresponding to the selected identification information to a subscriber to transmit a touch memo (619).

If identification information is not selected, the controller 100 sets entire communicating subscribers to a subscriber to transmit a touch memo (621).

If the communication state is not multilateral communication, i.e., if present hands free communication is one-to-one communication at step 613, the controller 100 sets a communicating subscriber to a subscriber to transmit a touch memo (623).

After a subscriber to transmit the touch memo is set, the controller 100 determines whether a transmitting form of the written touch memo is an image (631). In this case, identification information of a subscriber to transmit the touch memo may be a phone number, a method of transmitting the touch memo may be an SMS or an MMS, and the transmitting method may be previously determined and stored, or determined by the user selection. In this case, when the transmitting form is an MMS, the controller 100 determines that the touch memo is transmitted in an image file form, and generates an image file to transmit the touch memo (633). When the transmitting method is an SMS, the controller 100 generates a text file to transmit the touch memo. In this case, steps 631-635 may be omitted. Further, the controller 100 determines a subscriber to transmit the touch memo, and generates the touch memo into an image file.

The controller 100 transmits the generated image file to a preset subscriber through the communication unit 120 (637), and stores the transmitted image file (639).

A procedure of transmitting a touch memo at step 519 of FIG. 5 may be performed with the procedure of FIGS. 3 and 4.

The controller 100 determines whether a request for terminating an input of a touch memo is input in a state of writing the touch memo (521). If a request for terminating an input of a touch memo is input, the controller 100 stores the written touch memo at the storage unit 110 (523). As described above, when a touch memo input is activated, the controller 100 controls the display unit 130 display an item (e.g., transmitting item, termination item, or cancellation item) for processing a touch memo at a specific position of the display unit 130. When the user touches a corresponding item, the controller 100 performs a corresponding function. The item may be an icon or a soft button. Further, a command (transmission, termination, or cancellation) for processing the touch memo may be set to a specific touch pattern or gesture. In this case, when an action of a touch memo is controlled by item selection, if the termination item is touched, the controller 100 determines that a request for terminating an input of a touch memo is input and stores the written touch memo at the storage unit 110 (523). Here, the stored touch memo may have an image file form, and may be used when a request for transmission the touch memo is input, after communication is terminated. Further, although not shown in FIG. 5, when a cancellation item is selected, the written touch memo is deleted, and the communication mode is changed to a hands free communication mode.

When the user terminates communication while performing hands free communication, the controller 100 determines whether communication is terminated (531). If communication is terminated, the controller 100 terminates hands free communication (533). As described above, in a termination state of a hands free communication service, when a touch memo generated in the communication state is not transmitted, the controller 100 controls the display unit 130 to display whether a corresponding touch memo should be transmitted. In other words, in a hands free communication state, when a touch memo is generated, if a corresponding touch memo is not transmitted in a communication state, the controller 100 controls the display unit 130 to display whether to transmit a corresponding touch memo. A method of displaying whether to transmit the corresponding touch memo in the display unit 130 may be displayed in pop-up information or in an item form. Further, as described above, when it is not displayed whether to transmit a touch memo, transmission of a touch memo may be manually requested by the user.

After communication is terminated, the controller 100 determines whether a request for transmission of a touch memo is input (535). If a request for transmission of a touch memo is input, the controller 100 transmits the touch memo stored at the storage unit 110 to a preset subscriber (537).

Figure 7:
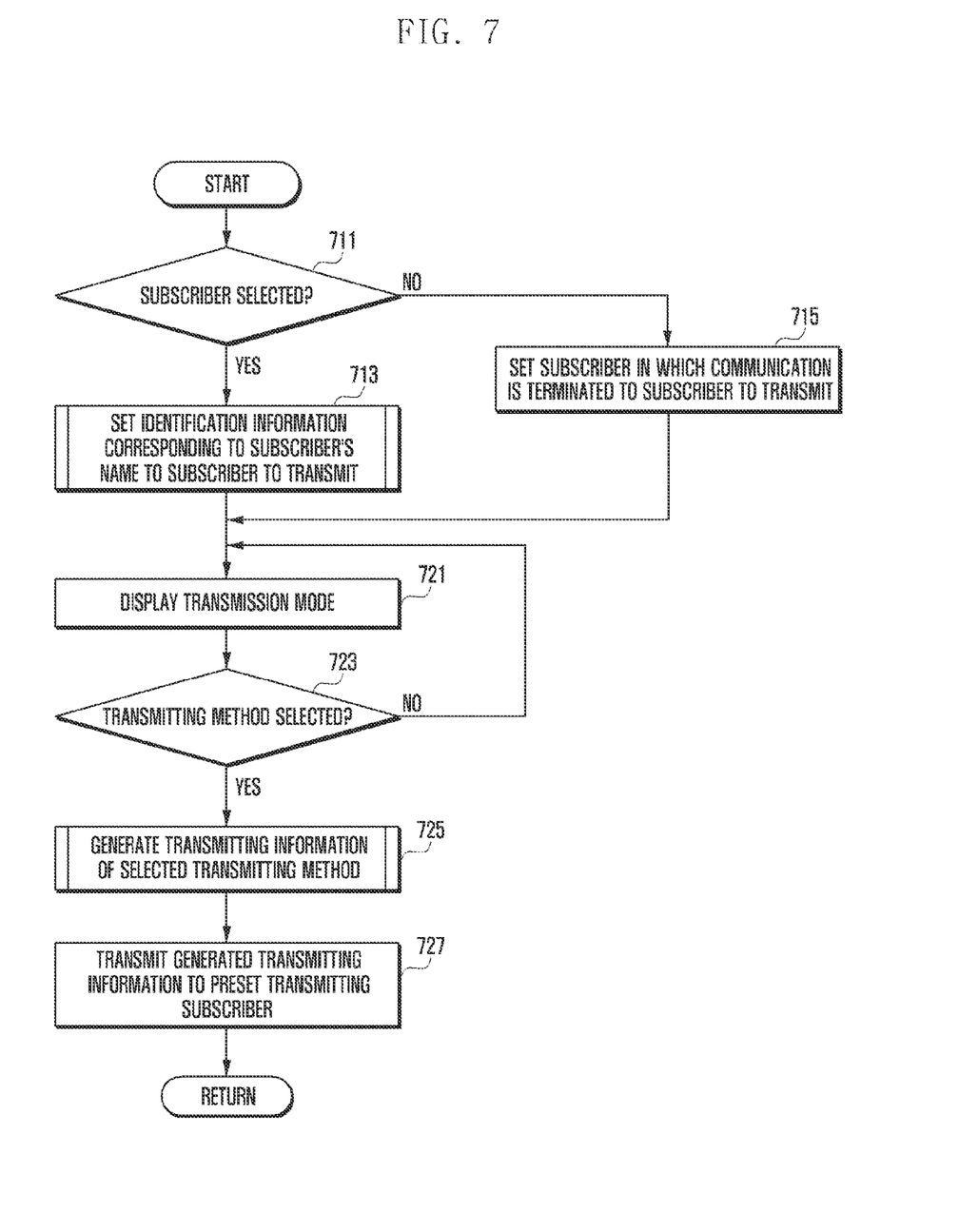
FIG. 7 is a flowchart illustrating a procedure of transmitting a touch memo at step 537 of FIG. 5.

FIG. 7 is a flowchart illustrating a procedure of transmitting a touch memo at step 537 of FIG. 5.

Referring to FIG. 7, after hands free communication is terminated, when a request for transmission of the touch memo is input, the controller 100 determines whether a subscriber to transmit the touch memo and displayed in the display unit 130 is selected (711). If a subscriber to transmit the touch memo is not selected, the controller 100 sets a subscriber in which communication is terminated to a subscriber to transmit a touch memo (715).

A selection of information of a subscriber for transmitting the touch memo after the communication is terminated may be set in various forms according to a transmitting method (transmission mode). As described above, the transmitting method may be an MMS, SMS, SNS, e-mail, and messenger. In this case, the MMS and the SMS may use a phone number and the SNS, e-mail, and a messenger may use respective sharing identification information. The e-mail, SNS, and messenger may have a plurality of identification information. For example, in the e-mail, the user may be subscribed with the same ID or different ID to an e-mail account, such as gmail.com, yahoo.com, and naver.com. For example, SNS is an on-line community type website and the user may be subscribed with the same ID or different IDs to various accounts such as Tweeter, Myspace, Facebook, and Cyworld. For example, a messenger is a communication method that may have a chat in real time through Internet and the user may be subscribed with the same ID or different ID to an account, such as MSN, YAHOO, Chaton, and Kakaotok. The identification information (i.e., a phone number, ID) may be stored at a phonebook.

Therefore, after communication is terminated, when the user requests a transmitting function, the controller 100 determines whether a subscriber name is selected from the phonebook or a subscriber name is input by the user (711). If a subscriber name is selected from the phonebook or a subscriber name is input by the user, the controller 100 controls the display unit 130 to display identification information corresponding to the subscriber name, and sets identification information corresponding to the subscriber name to a subscriber to transmit by user selection (713). In this case, a subscriber and a transmitting method to transmit a touch memo may be set together.

However, the subscriber identification information may be repeatedly set. In other words, the user may set the same ID to identification information of a plurality of transmitting methods (SNS, e-mail, or messenger). In this case, the controller 100 controls to display a transmission mode (transmitting method) registered at corresponding identification information (721), and the controller 100 determines whether a transmitting method is selected by the user (723). If a transmitting method is selected by the user, the controller 100 generates the stored touch memo in a file form of the selected transmitting method (725), and transmits the generated transmitting information (i.e., touch memo) to a preset subscriber with the selected transmitting method (727).

For example, when a subscriber selection is set by a phone number, the controller 100 selects a subscriber by a phone number (711), and sets the selected subscriber phone number to a subscriber to transmit a touch memo (713).

The controller 100 controls to display a transmission mode selection to an SMS or an EMS (721), and determines whether a transmission mode is selected (723). If a transmission mode is selected, the controller 100 generates and transmits a touch memo in a selected transmission mode (725 and 727). In this case, if a transmission mode is set to an MMS by default, the controller 100 may omit steps 721 and 723, and transmit a touch memo of an image file form to a corresponding subscriber (725 and 727). Further, when a transmitting subscriber of a touch memo is set by a phone number, the controller 100 may transmit a touch memo with an SMS or MMS transmitting method, while performing the procedure of FIG. 3 (725 and 727). In this case, operation of storing a touch memo in the process of FIG. 3 may be omitted.

Further, when a subscriber is selected by the subscriber identification information, if the subscriber identification information and account information is selected together, steps 721 and 723 may be omitted.

For example, when galaxy 11 is selected as the subscriber identification information at steps 711 and 713, it can be seen that ID is galaxy 11 and a transmitting method is e-mail. In this case, the controller 100 omits an operation procedure of steps 721 and 723 and generates and transmits the touch memo into an e-mail transmitting file form (725).

However, when galaxy 11 is selected, the controller 100 determines that ID is galaxy 11 (711 and 713), and controls the display unit 130 to display a transmitting method having identification information of galaxy 11 (721).

When the user selects a transmitting method corresponding to the identification information, the controller 100 transmits a touch memo in a form of the corresponding transmitting method (725 and 727).

In this case, the transmitted touch memo may have a form of Table 1 according to a transmitting method.

TABLE 1

| Transmitting method | Transmitting form of touch memo |
|---|---|
| MMS | Image file |
| | If terminals are the same kind, transmit editable image file. |
| | If terminals are different kind, transmit general image file. |
| SMS | Transmit file converted to text |
| E-mail | Transmit touch memo in attached file form |
| SNS | Transmit touch memo in attached file form |
| Messenger | Transmit touch memo in attached file form |

As described above, in a hands free communication state, the terminal may write information input through a touch panel in a touch memo, and transmit the written touch memo to the communicating subscriber side in a communication state. Further, a terminal, according to an exemplary embodiment, writes and stores information input through a touch panel in a touch memo in a hands free communication state. After communication is terminated, the terminal sets subscribers to transmit, and transmits stored touch memo to a preset subscriber.

As described above, according to the exemplary embodiments, in a terminal having a touch panel in a hands free communication mode, information shared in a communication state can be written in a touch memo, and the written touch memo can be transmitted to another subscriber or a selected subscriber in a communication state or after communication is terminated.

According to another exemplary embodiment, any of the communication unit 120, the display unit 130, the touch panel 140, and the short range communication unit 170 may include at least one processor for performing their respective functions. Further, any of the communication unit 120, the display unit 130, the touch panel 140, and the short communication unit 170 may include a circuit or a hardware module for performing their respective functions.

Although exemplary embodiments have been described in detail, it should be clearly understood that many variations and modifications of the exemplary embodiments, which may appear to those skilled in the art, will still fall within the spirit and scope of the exemplary embodiments, as defined in the appended claims.

What is claimed is:

1. A method of processing a memo while performing communication in a terminal, the method comprising:
 performing the communication;
 activating a touch memo input mode in response to a predetermined event occurring during the communication;
 displaying a touch memo on a display device in a communication state and performing a communication service, in response to receiving an input of the touch memo; and
 transmitting the touch memo to a communicating subscriber and maintaining the communication state after a request for transmission of the touch memo is input, wherein the transmitting of the touch memo to the communicating subscriber comprises:
 displaying a list including at least one transmitting method for transmitting the touch memo to the communicating subscriber,
 selecting a transmitting method of the at least one transmitting method by a user input,
 identifying a type of a terminal of the communicating subscriber,
 converting the touch memo into a transmittable format corresponding to the selected transmitting method and the type of the terminal of the communicating subscriber, and
 transmitting the converted touch memo to the communicating subscriber,
wherein transmitting the converted touch memo to the communicating subscriber comprises:
 in response that the transmitting method is a multimedia message service (MMS), comparing the type of the terminal with a type of a terminal of the communicating subscriber,
 in response that the terminal and the terminal of the communicating subscriber are a same type, transmitting an editable image file to the communicating subscriber, and
 in response that the terminal and the terminal of the communicating subscriber are not the same type, transmitting a general image to the communicating subscriber.

2. The method of claim 1, wherein the transmitting method comprises short message service (SMS), multimedia message service (MMS), e-mail service, social networking service (SNS), or messenger service.

3. The method of claim 1, wherein the activating of the touch memo input mode is started by the predetermined event which comprises sensing an event in which a distance between the terminal and a user increases at least a predetermined distance.

4. The method of claim 1, wherein the activating of the touch memo input mode is started by the predetermined event which comprises sensing an event in which a preset gesture is input.

5. The method of claim 1, wherein the converting of the touch memo into the transmittable format comprises:
 converting, if the transmitting method is a short message service (SMS), the touch memo into a text.

6. The method of claim 1, wherein the converting of the touch memo into the transmittable format comprises:
 converting, if the transmitting method is a multimedia message service (MMS), the touch memo into an image file.

7. The method of claim 1, wherein the transmitting of the touch memo to the communicating subscriber further comprises:
 determining whether the communication state is a multilateral communication state;
 setting, if the communication state is the multilateral communication state, a selected communicating subscriber as a subscriber to transmit the touch memo; and
 setting, if the communication state is a single communication state, the communicating subscriber as the subscriber to transmit the touch memo.

8. A method of processing a memo while performing communication in a terminal, the method comprising:
 performing the communication;
 activating a touch memo input mode in response to a predetermined event occurring;
 displaying a touch memo on a display device in a communication state and performing a communication service, in response to receiving an input of the touch memo;
 storing the touch memo in response to a request for storage of the input touch memo; and
 transmitting the touch memo after the communication is terminated in response to a request for transmission of the touch memo after communication termination is input,
wherein the transmitting of the touch memo after the communication is terminated comprises:
 displaying a list including at least one transmitting method for transmitting the touch memo to the communicating subscriber,
 selecting a transmitting method of the at least one transmitting method by a user input,
 identifying a type of a terminal of the communicating subscriber,
 converting the touch memo into a transmittable format corresponding to the selected transmitting method and the type of the terminal of the communicating subscriber, and
 transmitting the converted touch memo to the subscriber,
wherein transmitting the converted touch memo to the subscriber comprises:
 in response that the transmitting method is a multimedia message service (MMS), comparing the type of the terminal with a type of a terminal of the subscriber,
 in response that the terminal and the terminal of the subscriber are a same type, transmitting an editable image file to the subscriber, and
 in response that the terminal and the terminal of the subscriber are not the same type, transmitting a general image to the subscriber.

9. The method of claim 8, wherein the transmitting method comprises short message service (SMS), multimedia message service (MMS), e-mail service, social networking service (SNS), or messenger service.

10. The method of claim 8, wherein the activating of the touch memo input mode is started by the predetermined event which comprises sensing an event in which a distance between the terminal and a user increases at least a predetermined distance.

11. The method of claim 8, wherein the activating of the touch memo input mode is started by the predetermined event which comprises sensing an event in which a preset gesture is input.

12. The method of claim 8, wherein the converting of the touch memo into the transmittable format comprises:
 converting, if the transmitting method is a short message service (SMS), the touch memo into a text.

13. The method of claim 8, wherein the converting of the touch memo into the transmittable format comprises:
 converting, if the transmitting method is a multimedia message service (MMS), the touch memo into an image file.

14. An apparatus for processing a memo while performing communication, the apparatus comprising:
 a communication unit;
 a touch panel;
 a display unit;
 a storage unit; and
 a controller configured to:

activate a touch memo input mode in response to a predetermined event occurring during the communication, generate a touch memo in response to receiving an input of the touch memo, control the communication unit to transmit the touch memo to a communicating subscriber, in response to a request for transmission of the input touch memo, and maintain the communication state, wherein the controller is further configured to:

control the display unit to display a list including at least one transmitting method for transmitting the touch memo to the communicating subscriber, select a transmitting method of the at least one transmitting method by a user input, identify a type of a terminal of the communicating subscriber, convert the touch memo into a transmittable format corresponding to the selected transmitting method and the type of the terminal of the communicating subscriber, and control the communication unit to transmit the converted touch memo to the communicating subscriber, wherein the controller is further configured to:

in response that the transmitting method is a multimedia message service (MMS), compare the type of the terminal with a type of a terminal of the communicating subscriber, in response that the terminal and the terminal of the communicating subscriber are a same type, control the communication unit to transmit an editable image file to the communicating subscriber, and in response that the terminal and the terminal of the communicating subscriber are not the same type, control the communication unit to transmit a general image to the communicating subscriber.

15. The apparatus of claim 14, wherein the transmitting method comprises short message service (SMS), multimedia message service (MMS), e-mail service, social networking service (SNS), or messenger service.

16. The apparatus of claim 14, wherein the controller is further configured to:

convert, if the transmitting method is a short message service (SMS), the touch memo into a text; and convert, if the transmitting method is a multimedia message service (MMS), the touch memo into an image file.

17. The apparatus of claim 14, wherein the controller is further configured to:

determine whether the communication state is a multilateral communication state;

set, if the communication state is the multilateral communication state, a selected communicating subscribers as a subscriber to transmit the touch memo; and set, if the communication state is a single communication state, the communicating subscriber as the subscriber to transmit the touch memo.

* * * * *